(12) United States Patent
Horvath et al.

(10) Patent No.: US 6,736,514 B2
(45) Date of Patent: May 18, 2004

(54) IMAGING APPARATUS FOR INCREASED COLOR GAMUT USING DUAL SPATIAL LIGHT MODULATORS

(75) Inventors: Louis S. Horvath, Rochester, NY (US); James E. Roddy, Rochester, NY (US); Robert J. Zolla, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/177,513

(22) Filed: Jun. 21, 2002

(65) Prior Publication Data

US 2003/0234911 A1 Dec. 25, 2003

(51) Int. Cl.$^7$ ............................................. G03B 21/00
(52) U.S. Cl. ............................................. 353/31; 353/122
(58) Field of Search ............................. 353/30, 31, 32, 353/33, 34, 20, 7, 8, 73, 81, 82, 122; 352/42, 66

(56) References Cited

U.S. PATENT DOCUMENTS

| | | | | |
|---|---|---|---|---|
| 1,607,593 | A | * 11/1926 | O'Grady | 352/66 |
| 4,441,791 | A | 4/1984 | Hornbeck | |
| 5,255,082 | A | * 10/1993 | Tamada | 348/750 |
| 5,535,047 | A | 7/1996 | Hornbeck | |
| 5,537,258 | A | 7/1996 | Yamazaki et al. | |
| 5,570,213 | A | 10/1996 | Ruiz et al. | |
| 5,600,383 | A | 2/1997 | Hornbeck | |
| 5,612,753 | A | 3/1997 | Poradish et al. | |
| 5,620,755 | A | 4/1997 | Smith, Jr. et al. | |
| 5,719,695 | A | 2/1998 | Heimbuch | |
| 5,795,047 | A | 8/1998 | Sannohe et al. | |
| 5,828,424 | A | 10/1998 | Wallenstein | |
| 5,905,545 | A | 5/1999 | Poradish et al. | |
| 5,914,818 | A | 6/1999 | Tejada et al. | |
| 5,921,650 | A | 7/1999 | Doany et al. | |
| 5,930,050 | A | 7/1999 | Dewald | |
| 5,982,992 | A | 11/1999 | Waldron | |
| 6,008,951 | A | 12/1999 | Anderson | |
| 6,020,937 | A | * 2/2000 | Bardmesser | 348/756 |
| 6,089,717 | A | 7/2000 | Iwai | |
| 6,191,826 | B1 | 2/2001 | Murakami et al. | |
| 6,203,160 | B1 | 3/2001 | Ho | |
| 6,217,174 | B1 | 4/2001 | Knox | |
| 6,220,710 | B1 | 4/2001 | Raj et al. | |
| 6,247,816 | B1 | 6/2001 | Cipolla et al. | |
| 6,256,073 | B1 | 7/2001 | Pettitt | |
| 6,280,034 | B1 | 8/2001 | Brennesholtz | |
| 6,497,487 | B2 | * 12/2002 | Lee | 353/31 |
| 6,536,904 | B2 | * 3/2003 | Kunzman | 353/31 |
| 6,536,906 | B2 | * 3/2003 | Fujimori et al. | 353/119 |
| 6,567,134 | B1 | * 5/2003 | Morgan | 348/743 |
| 6,568,815 | B2 | * 5/2003 | Yano | 353/84 |

FOREIGN PATENT DOCUMENTS

| | | |
|---|---|---|
| EP | 586139 B1 | 5/1998 |
| WO | 01/95544 | 12/2001 |

OTHER PUBLICATIONS

R. Berns; Principles of Color Technology; 2000; pp. 59–65.
R.W.G. Hunt; The Reproduction of Colour; pp. 106–135.

\* cited by examiner

*Primary Examiner*—Russell Adams
*Assistant Examiner*—Andrew Sever
(74) *Attorney, Agent, or Firm*—Nelson Adrian Blish

(57) ABSTRACT

A display apparatus (10) for projection of a color image from digital data onto a surface (140) comprises a first modulation system which provides a first modulated beam. The first modulation system comprises a first spatial light modulator for modulating a first incident light beam in order to form the first modulated beam according to the digital data; a first light source provides a first color beam as the first incident light beam; and a second light source provides a second color beam as the first incident light beam. A second modulation system provides a second modulated beam. The second modulation system comprises a second spatial light modulator for modulating a second incident light beam in order to form the second modulated beam according to the digital data; a third light source provides a third color beam as the second incident light beam; and a fourth light source provides a fourth color beam as the second incident light beam. An optical combiner (30) directs the first modulated beam and the second modulated beam for projection onto the surface by a projection lens.

33 Claims, 9 Drawing Sheets

IMAGING APPARATUS FOR INCREASED COLOR GAMUT USING DUAL SPATIAL LIGHT MODULATORS

FIELD OF THE INVENTION

This invention generally relates to apparatus for forming color images from digital data onto a surface and more particularly relates to an apparatus having a pair of spatial light modulators, each spatial light modulator temporally shared between two light sources.

BACKGROUND OF THE INVENTION

A number of different color spaces have been used to describe the human visual system. In one attempt to define a workable color space, Commission Internationale de l'Eclairage (International Commission on Illumination) developed the CIE Chromaticity Diagram, published in 1931. The CIE color model employed the tristimulus values X, Y, Z based on a standard human observer. The diagram in x and y was later modified to a u' and v' diagram in which equal distances on the diagram represent equal perceived color shifts. Useful background discussion of color perception and color models can be found in Billmeyer and Saltznann's *Principles of Color Technology*, Third Edition, Wiley and Sons, and in Dr. R. W. G. Hunt's *The Reproduction of Color*, Fifth Edition, Fountain Press, England.

FIG. 1 shows a familiar color gamut representation using CIE 1976 L*u*v* conventions, with the perceived eye-brain color gamut in u'-v' coordinate space represented as a visible gamut 100. Pure, saturated spectral colors are mapped to the "horseshoe" shaped periphery of the visible gamut 100 curve. The interior of the "horseshoe" contains all mappings of mixtures of colors, such as spectral red with added blue, which becomes magenta, for example. The interior of the horseshoe can also contain mixtures of pure colors with white, such as spectral red with added white, which becomes pink, for example. The overall color area defined by the "horseshoe" curve of visible gamut 100 is the full range of color that the human visual system can perceive. It is desirable to represent as much as possible of this area in a color display to come as close as possible to representing the original scene as we would perceive it if we were actually viewing it.

Conventional motion picture display, whether for large-scale commercial color projection from film or for color television cathode ray tubes (CRTs), operates within a fairly well-established color gamut. Referring again to the mapping of FIG. 1, observe that visible gamut 100 shows the full extent of human-perceivable color that, in theory, could be represented for motion picture display. A motion picture film gamut 102 is mapped out within visible gamut 100, showing the reduced extent of color representation achievable with conventional film media. An NTSC TV gamut 104 shows the further restriction placed on achievable colors using conventional color CRT phosphors. It is instructive to note that, because the colors of the CRT phosphors for NTSC TV gamut 104 are not typically saturated, the points defining the color of each phosphor do not lie on the periphery of visible gamut 100. Hence, for example, colors such as turquoise and neon orange can be perceived by the eye in the actual scene but are beyond the color capability of a CRT phosphor system. As is clear from FIG. 1, the range of colors that can be represented using conventional film or TV media falls far short of the full perceivable range of visible gamut 100.

The component colors used for motion picture film have employed red, green, and blue dyes (or their complementary counterparts cyan, magenta, and yellow) as primary colors. Component colors for color television CRTs have employed red, green, and blue phosphors. These dyes and phosphors, initially limited in the colors that they could represent, have been steadily improved. However, as is clear from the gamut mapping represented in FIG. 1, there is still room for improvement in approximating visible gamut 100 in both motion picture and TV environments.

With the advent of digital technology and the demonstration of all-digital projection systems, there is renewed interest in increasing the range or gamut of colors that can be displayed in order to provide a more realistic, more vivid image than is possible with the gamut limitations of film dyes or phosphors. The most promising solutions for digital cinema projection employ, as image forming devices, one of two types of spatial light modulators (SLMs). A spatial light modulator can be considered essentially as a two-dimensional array of light-valve elements, each element corresponding to an image pixel. Each array element is separately addressable and digitally controlled to modulate transmitted or reflected light from a light source. There are two salient types of spatial light modulators that are being employed for forming images in projection and printing apparatus: digital micro-mirror devices (DMDs) and liquid crystal devices (LCDs).

Texas Instruments has demonstrated prototype projectors using one or more DMDs. DMD devices are described in a number of patents, for example U.S. Pat. Nos. 4,441,791; 5,535,047; 5,600,383 (all to Hornbeck); and U.S. Pat. No. 5,719,695 (Heimbuch). Optical designs for projection apparatus employing DMDs are disclosed in U.S. Pat. Nos. 5,914,818 (Tejada et al.); U.S. Pat. No. 5,930,050 (Dewald); U.S. Pat. No. 6,008,951 (Anderson); and U.S. Pat. No. 6,089,717 (Iwai). LCD devices are described, in part, in U.S. Pat. No. 5,570,213 (Ruiz et al.) and U.S. Pat. No. 5,620,755 (Smith, Jr. et al.).

While there has been some success in color representation using spatial light modulators, there is a long-felt need for a further broadening of the projection color gamut that will enhance special effects and heighten the viewing experience for an audience.

Faced with a similar problem of insufficient color gamut, the printing industry has used a number of strategies for broadening the relatively narrow gamut of pigments used in process-color printing. Because conventional color printing uses light reflected from essentially white paper, the color representation methods for print employ a subtractive color system. Conventionally, the process colors cyan (blue+green), magenta (red+blue), and yellow (red+green) are used for representing a broad range of colors. However, due to the lack of spectral purity of the pigment, combinations of cyan, magenta and yellow are unable to yield black, but instead provide a dark brown hue. To improve the appearance of shadow areas, black is added as a fourth pigment. As is well known in the printing arts, further refined techniques, such as undercolor removal could then be used to take advantage of less expensive black pigments in full-color synthesis. Hence, today's conventional color printing uses the four color CMYK (Cyan, Magenta, Yellow, and blacK) method described above.

However, even with the addition of black, the range of colors that can be represented by printing pigments is limited. There remain specialized colors such as metallic gold or silver, or specific colors such as those used for corporate identity in logos and packaging, for example, that cannot be adequately reproduced using the CMYK "process color" system. To meet this need, a fifth pigment can be added to a selected print run in order to provide "spot color" over specific areas of an image. Using this technique, for example, many companies use special color inks linked to a product or corporate identity and use these colors in packaging, advertising, logos, and the like, so that the consumer recognizes a specific product, in part, by this special color.

Colors in addition to the conventional CMYK process color set have been employed to extend the overall color gamut in printing applications. For example, EP 0 586 139 (Litvak) discloses a method for expanding the conventional color gamut that uses the four-color CMYK space to a color space using five or more colors.

Referring back to FIG. 1, it is instructive to note that the color gamut is essentially defined by a polygon, where each vertex corresponds to a substantially pure, saturated color source used as a component color. The area of the polygon corresponds to the size of the color gamut. To expand the color gamut requires moving one or more of these vertices closer to the outline of visible gamut 100. Thus, for example, addition of a color that is inside the polygon defining the color gamut does not expand the color gamut. For example, U.S. Pat. No. 5,982,992 (Waldron) discloses using an added "intra-garnut" colorant in a printing application. However, as noted in the specification of U.S. Pat. No. 5,982,992, this method does not expand the color gamut itself, but can be used for other purposes, such as to provide improved representation of pastels or other colors that are otherwise within the gamut but may be difficult to represent using conventional colorants.

Conventional color models, such as the CIE LUV model noted above, represent each individual color as a point in a three-dimensional color space, typically using three independent characteristics such as hue, saturation, and brightness, that can be represented in a three-dimensional coordinate space. Color data, such as conventional image data for a pixel displayed on a color CRT, is typically expressed with three-color components (for example R, G, B). Conventional color projection film provides images using three photosensitized emulsion layers, sensitive to red, blue, and green illumination. Because of these conventional practices and image representation formats, developers of digital projection systems have, understandably, adhered to a three-color model. In conformance with conventional practices, developers have proposed various solutions, such as filtering a bright white light source to obtain red, green, and blue component colors for full color image projection. For example, U.S. Pat. No. 6,247,816 (Cipolla et al.) discloses a digital projection system employing dichroic optics to split source white light into suitable red, green, and blue color components.

There have been proposed projection solutions that may employ more than three-color light sources. However, the bulk of solutions proposed have not targeted color gamut expansion. Disclosures of projectors using more than three color sources include U.S. Pat. No. 6,256,073 (Pettit) which discloses a projection apparatus using a filter wheel arrangement that provides four colors in order to maintain brightness and white point purity. However, the fourth color added in this configuration is not spectrally pure, but is white in order to add brightness to the display and to minimize any objectionable color tint. It must be noted that white is analogous to the "intra-gamut" color addition noted in the printing application of U.S. Pat. No. 5,982,992. That is, as is well established in color theory, adding white actually reduces the color gamut.

Similarly, U.S. Pat. No. 6,220,710 (Raj et al.) discloses the addition of a white light channel to standard R, G, B light channels in a projection apparatus. As was just noted, the addition of white light may provide added luminosity, but constricts the color gamut.

U.S. Pat. No. 6,191,826 (Murakami et al.) discloses a projector apparatus that uses four colors derived from a single white light source, where the addition of a fourth color, orange, compensates for unwanted effects of spectral distribution that affect the primary green color path. In the apparatus of U.S. Pat. No. 6,191,826, the specific white light source used happens to contain a distinctive orange spectral component. To compensate for this, filtering is used to attenuate undesirable orange spectral content from the green light component in order to obtain a green light having improved spectral purity. Then, with the motive of compensating for the resulting loss of brightness, a separate orange light is added as a fourth color. The disclosure indicates that some expansion of color range is experienced as a side effect. However, with respect to color gamut, it is significant to observe that the solution disclosed in U.S. Pat. No. 6,191,826 does not appreciably expand the color gamut of a projection apparatus. In terms of the color gamut polygon described above with reference to FIG. 1, addition of an orange light may add a fourth vertex; however, any added orange vertex would be very close to the line already formed between red and green vertices. Thus, the newly formed gamut polygon will, at best, exhibit only a very slight increase in area over the triangle formed using three component colors. Moreover, unless a pure wavelength orange is provided, with no appreciable leakage of light having other colors, there could even be a small decrease in color gamut using the methods disclosed in U.S. Pat. No. 6,191,826.

U.S. Pat. No. 6,280,034 (Brennesholtz) discloses a projection apparatus using up to six colors, employing RGB as well as CMY (cyan, magenta, and yellow) colors that are obtained from a broadband light source. Although such an approach may be useful to enhance brightness and luminance for some colors, the addition of complementary CMY colors does not expand the color gamut and, in practice, could result in a smaller color gamut. Additionally, the embodiment disclosed in U.S. Pat. No. 6,280,034 uses light sources having different polarizations, which prevents use of an analyzer for improving contrast.

In contrast to the above patent disclosures, Patent Application WO 01/95544 A2 (Ben-David et al.) discloses a display device and method for color gamut expansion using four or more substantially saturated colors. While the disclosure of application WO 01/95544 provides improved color gamut, however, the embodiments and methods disclosed apply conventional solutions for generating and modulating each color. The solutions disclosed use either an adapted color wheel with a single spatial light modulator or use multiple spatial light modulators, with a spatial light modulator dedicated to each color. With only one spatial light modulator, however, the timing requirements for display data when multiplexing more than three colors become very demanding, requiring high-speed display devices and image data processing support components. It would be particularly difficult to use LCD spatial light modulators with such an arrangement, since the data settling time required by these devices, which can be as much as 10–20 msec or longer for each color, shortens the available projection time and limits the overall brightness when using more than three colors. Image data must be processed and loaded to a spatial light modulator at very high speeds when using such a solution, possibly necessitating a parallel processing arrangement. Using a filter wheel or similar device has inherent disadvantages. There is considerable "dead time" during filter wheel transitions from one color to the next, which limits the amount of time available for modulation of each color. This reduces the available brightness levels that can be achieved. A filter wheel used in an implementation with four or more colors would require high speed revolution, with timing feedback control to maintain precision synchronization with data loading and device response. Without some shuttering means, color crosstalk becomes a problem. Color crosstalk would occur, for example, at a transition of light color while the corresponding data transition is also in process. For these reasons, the filter wheel approach disclosed in WO 01/95544, while it may provide incremental gamut improvement, introduces cost and complexity to projector design and makes it difficult to deliver sufficient brightness for large-scale projection applications. An alternative approach using a separate spatial light modulator for each component color is also noted in the WO 01/95544 application. However, such a solution is expensive and, using the optical arrangement disclosed, would require precise alignment, with re-alignment for different projection distances. Thus, the added cost in using four or more spatial light modulators may not justify an incremental improvement in color gamut for commercial projection devices.

Thus, it can be seen that, with respect to projection apparatus, there have been solutions using a fourth color, however, few of these solutions target the expansion of the color gamut as a goal or disclose methods for obtaining an expanded color gamut. In fact, for many of the solutions listed above, there can even be some loss of color gamut with the addition of a fourth color. Solutions for expanding color gamut such as those disclosed in the WO 01/95544 application would be difficult and costly to implement.

Referring back to FIG. 1, it is instructive to note that the broadest possible gamut is achieved when component colors, that is, colors represented by the vertices of the color gamut polygon, are spectrally pure colors. In terms of the gamut mapping of FIG. 1, a spectrally pure color would be represented as a single point lying on the boundary of the curve representing visible gamut 100. As is well known in the optical arts, lasers inherently provide light sources that exhibit high spectral purity. For this reason, lasers are considered as suitable light sources for digital color projection. In some conventional designs, laser beams are modulated and combined and then raster scanned using electro-mechanical high speed vertical and low speed horizontal scanners. These scanners typically comprise spinning polygons for high speed scanning and galvanometer driven mirrors for low speed deflection. Vector scan devices that write "cartoon character" outlines with two galvanometer scanners have long been on the market for large area outdoor laser displays, for example. Lasers have also been used with spatial light modulators for digital projection. As one example, U.S. Pat. No. 5,537,258 (Yamazaki et al.) discloses a laser projection system with red, green, and blue dye lasers providing the primary colors for forming an image using a single shared spatial light modulator.

There have been proposed solutions using more than 3 lasers within a projector wherein the additional laser serves a special purpose other than color projection. For example, U.S. Pat. No. 6,020,937 (Bardmesser) discloses a TV display system using as many as four color lasers; however, the fourth laser provides an additional source for achieving increased scan speed and is not a fourth color source. The use of a fourth pump laser is noted in U.S. Pat. No. 5,537,258 cited above and in U.S. Pat. No. 5,828,424 (Wallenstein), which discloses a color projection system that uses a pump laser source with frequency multipliers to excite projection lasers having the conventional R, G, B colors. Again, this use of a fourth laser does not add a fourth projection color.

In order for digital color projection to compete with conventional film projection technology, it would be advantageous to provide a digital projection apparatus that provides a color gamut having a wider range of colors than can presently be represented. It is desirable to increase the gamut of colors displayed to achieve, inasmuch as is possible, the color gamut of the human eye.

Unlike color projection film, digital projection presents a full-color image as a composite of individual component color frames, conventionally as red, green, and blue components. A digital projection apparatus, such as that disclosed in U.S. Pat. No. 5,795,047 (Sannohe et al.) may provide all three component color frames simultaneously. However, this method requires three separate spatial light modulators, one dedicated to each color. As a less expensive alternative, a single spatial light modulator can be shared, providing a sequence of component color frames, multiplexed at a rapid rate, so that the human eye integrates separately displayed color frames into a single color image. When using three colors, this multiplexing method may be capable of providing a color-sequenced image in a series of component color frames that are switched rapidly enough so that color transitions arc imperceptible to an observer. However, as was noted above with reference to application WO 01/95544, a four-color projection apparatus may not be able to provide frame sequencing at a sufficient rate for maintaining flicker-free imaging at needed brightness levels. Moreover, at the same time, the added cost of a fourth spatial light modulator may be prohibitive, preventing manufacturers from taking advantage of the additional color gamut that is available.

There have been a number of solutions proposed for reducing the number of spatial light modulators used in a projection apparatus. Field-sequential or color-sequential operation, widely used for low-end projectors such as those used for business presentations, employs a single spatial light modulator that is temporally shared for each of the primary RGB colors, in multiplexed fashion. However, device response time problems for data loading, setup, and modulation response time limit the usefulness of the field-sequential approach for higher quality devices. Proposed alternatives to alleviate response time constraints include configurations using dual spatial light modulators, as in U.S. Pat. No. 6,203,160 (Ho), which discloses a projection apparatus using two spatial light modulators, one for modulating the s-polarization component of incident light, the other for modulating the p-polarization component. With a similar approach, U.S. Pat. No. 5,921,650 (Doany et al.) also discloses a projector using two spatial light modulators, one for light having s-polarization and one for light having p-polarization. While the approaches used in U.S. Pat. Nos. 6,203,160 and 5,921,650 provide some advantages with respect to efficient use of light, this type of approach has some drawbacks. Achieving high contrast when using both s- and p-polarization states can be difficult, requiring additional polarization devices in each light modulation path. Both U.S. Pat. No. 6,203,160 and 5,921,650 use a broadband white light and a color filter wheel for providing a color illumination source. This approach adds mechanical cost and complexity and limits the flexibility of the illumination system.

U.S. Pat. No. 6,217,174 (Knox) discloses an image display apparatus using two spatial light modulators, with the first spatial light modulator dedicated to a single primary color and the second spatial light modulator multiplexed between the other two primary colors using a color shutter. This approach reduces the switching speed requirements of apparatus using a single spatial light modulator. However, the apparatus disclosed in U.S. Pat. No. 6,217,174, since it is intended for use within a small display device, is designed for a lamp-based light source. It would prove difficult to obtain the necessary brightness or image quality for a projector apparatus using the approach of U.S. Pat. No. 6,217,174, for example.

U.S. Pat. Nos. 5,612,753 and 5,905,545 (Poradish et al.) disclose projection apparatus that employ two spatial light modulators, each within a modulator system that has its own projection lens. For providing source illumination, a color filter wheel is deployed in the path of a broadband light source. The approach disclosed in U.S. Pat. Nos. 5,612,753 and 5,905,545 alleviate the timing constraints of projection apparatus when compared against approaches using a single spatial light modulator in field sequential fashion. However, the arrangement of components disclosed in these patents is mechanically complex, requires multiple separate projection optics and, because it derives color illumination from a broadband light source, is limited with respect to brightness.

The apparatus disclosed in U.S. Pat. No. 6,280,034 (Brennesholtz) described above utilizes dual spatial light modulators, one for RGB primary colors, the other for CMY complementary colors. As was noted, this approach augments the luminance range available, rather than expanding the color gamut. Moreover, with this arrangement, both spatial light modulators operate in color sequential mode, each shared among three colors in multiplexed fashion. Thus, the arrangement of U.S. Pat. No. 6,280,034 provides no relief for timing problems due to color sequential operation when compared with existing three-color projection solutions.

Thus, although there have been some proposed solutions using two spatial light modulators for projection apparatus using three or more colors, there is room for improvement. Lamps and other broadband light sources set practical limits on brightness levels achievable, particularly where color filter wheels or similar devices that cause some amount of light attenuation or have inherent "dead space" during transitions are employed. The use of color wheels makes it unwieldy to alter or adjust illumination timing. Response times of spatial light modulator devices further constrain the possible timing sequences, particularly where these devices are multiplexed among three colors. In the face of these difficulties, the advantages of expanding the color gamut with an additional color would not be considered within reach using conventional design approaches.

At the same time, an ongoing concern of motion picture producers relates to the loss of substantial potential revenue due to illegal camcorder copying of movies from the projection screen. While various copy protection methods using conventional digital projection apparatus have been tried, there is room for improvement.

Thus, it can be seen that although conventional approaches to digital projection can be used with a four-color projection system, there is a need for inventive solutions that ease performance constraints, allow improved image quality, and offer opportunities for camcorder defeat.

SUMMARY OF THE INVENTION

Briefly, according to one aspect of the present invention provides a display apparatus for projection of a color image from digital data onto a surface, the apparatus comprising:

(a) a first modulation system for providing a first modulated beam, the first modulation system comprising:
  (a1) a first spatial light modulator for modulating a first incident light beam in order to form the first modulated beam according to the digital data;
  (a2) a first light source for providing a first color beam as the first incident light beam;
  (a3) a second light source for providing a second color beam as the first incident light beam;
(b) a second modulation system for providing a second modulated beam, the second modulation system comprising:
  (b1) a second spatial light modulator for modulating a second incident light beam in order to form the second modulated beam according to the digital data;
  (b2) a third light source for providing a third color beam as the second incident light beam;
  (b3) a fourth light source for providing a fourth color beam as the second incident light beam; and
(c) an optical combiner for directing the first modulated beam and the second modulated beam onto a common axis for projection onto the surface by a projection lens.

A feature of the present invention is the use of light sources having a high degree of spectral purity in order to provide the fullest possible color gamut. Lasers, because they are inherently color saturated, are the light sources used in the preferred embodiment.

A feature of the present invention is the use of a pair of spatial light modulators, each alternately modulated by one of two colors. This arrangement allows a number of timing sequences to be implemented for optimizing image quality as well as for allowing camcorder defeat schemes.

It is an advantage of the present invention that it provides an apparatus capable of achieving wider color gamut for displaying digital motion pictures when compared with conventional three-color laser and arc lamp based equipment. The apparatus and method of the present invention allows the display of colors that were not possible with previous systems.

It is an advantage of the present invention that it employs laser light, which is inherently polarized. Thus, there is no need for filtering or polarization of the laser light when directed toward an LCD spatial light modulator, and no consequent filter losses.

It is a further advantage of the present invention that it allows optimization of optical and support components for the light modulation path.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 6b is a timing diagram showing an alternate sequence of color transitions as a sequence of luminance-level transitions, at a higher relative frequency than that of FIG. 6a.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Theoretical Background for Expanding Color Gamut

Figure 1:
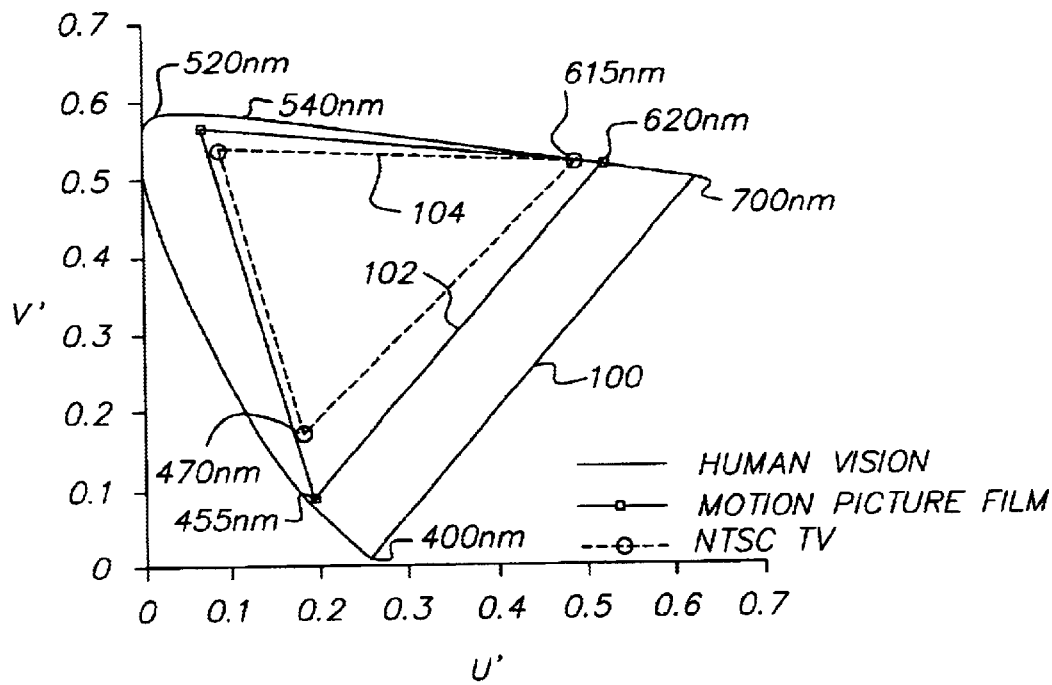
FIG. 1 is a graph showing conventional color gamut representation for NTSC TV and conventional motion picture film.

Referring back to the gamut mapping arrangement shown in FIG. 1, it is instructive to mention that a basic strategy for expanding the gamut of a display is to pick color sources that are on or close to the horseshoe periphery. Lasers, because they provide spectrally pure, saturated sources, are advantageous for this purpose and are the spectrally pure light sources of the preferred embodiment. Laser colors can be mapped directly to points lying on the horseshoe curve of visible gamut 100. Note that RGB LEDs can be used alternately as light sources that are substantially spectrally pure; however, LEDs are generally inferior to lasers with respect to both actual spectral quality and brightness.

Figure 2:
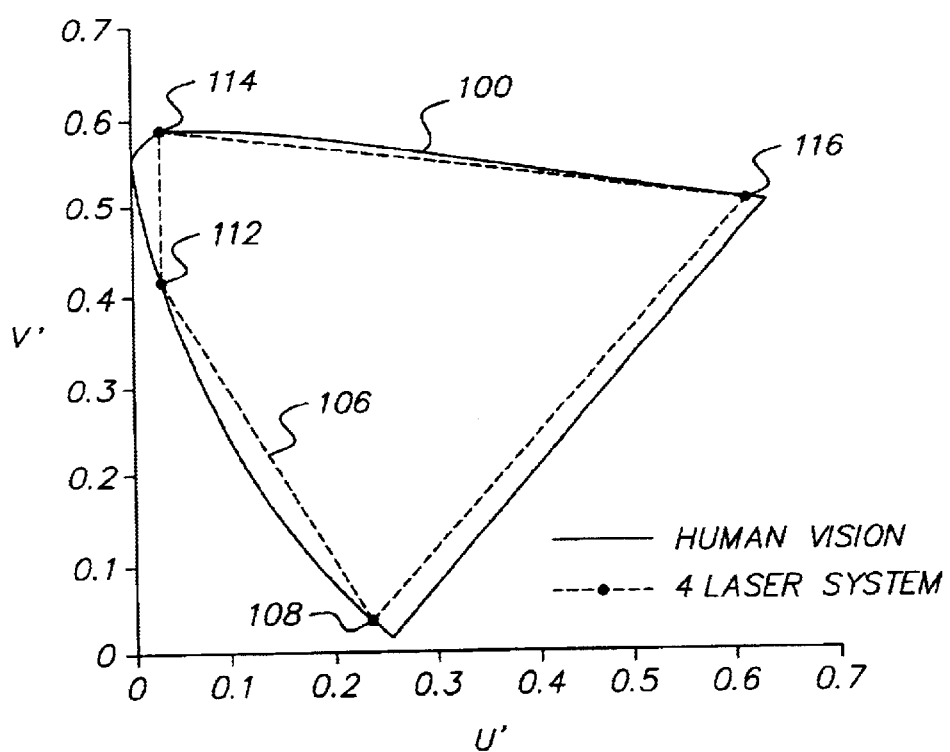
FIG. 2 is a graph showing an expanded color gamut using the method of the present invention.

Referring to FIG. 2, there is shown visible gamut 100 with a four-source gamut 106, as provided using the apparatus of the present invention. With the use of four lasers, the present invention allows a considerable portion of visible gamut 100 to be represented, as shown. In a preferred embodiment, the four vertices of four-source gamut 106 are provided by the following gas lasers, with the corresponding vertex indicated in FIG. 2:

Vertex 108—Helium-Cadmium at 442 nm

Vertex 112—Argon at 488 nm

Vertex 114—Argon at 515 nm

Vertex 116—Krypton at 647 nm

Of course, different lasers or other spectrally pure and bright light sources having different wavelengths could be selected, with appropriate shifting of one or more of vertices 108, 112, 114, 116 and corresponding adjustment to the shape of four-source gamut 106.

Figure 3:
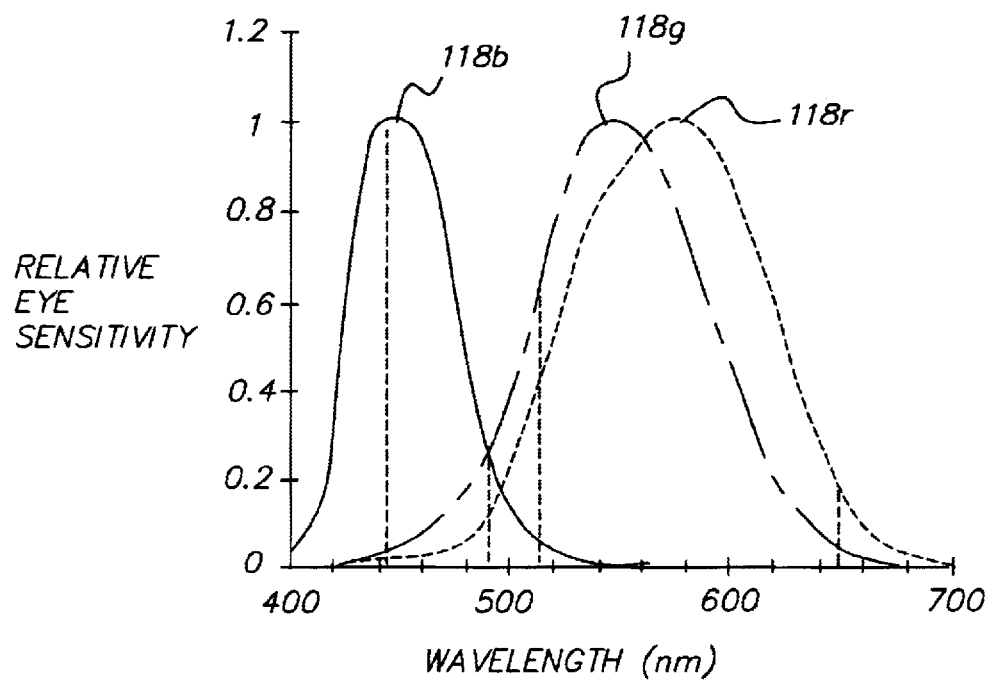
FIG. 3 is a graph showing the cone sensitivity of the human eye relative to wavelength.

The selection of optimal light source wavelengths depends upon which portions of visible gamut 100 need to be within the reach of the projection apparatus. A key factor in this consideration is human-eye response. Referring to FIG. 3, there is shown the normalized sensitivity of the three types of color receptors (cones) in the retina. Blue response is indicated by a blue sensitivity curve 118b, red response by a red sensitivity curve 118r, and green response by a green sensitivity curve 118g. Dotted vertical lines indicate the four laser wavelengths noted above for vertices 108, 112, 114, and 116. Note that the blue response is reasonably well separated, while there is considerable overlap of the red and green receptors, allowing considerable discrimination of colors in this region by judging the proportions of green and red. It is instructive to emphasize that the goal in color projection is to elicit an eye-brain color response that is as nearly identical to that caused by the original scene content as possible. For example, the original scene object may include bluish-green seawater, which reflects colors within the solar spectrum. Projection provides the same eye-brain response of the scene content, as closely as possible. While this can be accomplished using an appropriate combination of blue and green sources, the green source can unintentionally stimulate the eye's red receptor. For this reason, alternate use of a blue-green light source may be preferable for such scene content. The impact of this choice on perceived color gamut is best visualized graphically using the CIE chromaticity diagram, such as those of FIGS. 1 and 2. The selection of a suitable fourth spectrally pure light source expands the color gamut in that direction. Based on the chromaticity diagrams of FIGS. 1 and 2 and on the characteristic response of FIG. 3, it can be seen that, while there would be little advantage, for example, in selecting multiple lasers from the yellow and orange wavelengths, there could be substantial benefits in selecting an additional laser having a color in the blue-green wavelength. Another suitable alternative may be selection of a laser having a wavelength in the yellow-green color range.

Preferred Embodiment for Projection System 10

Figure 4A:
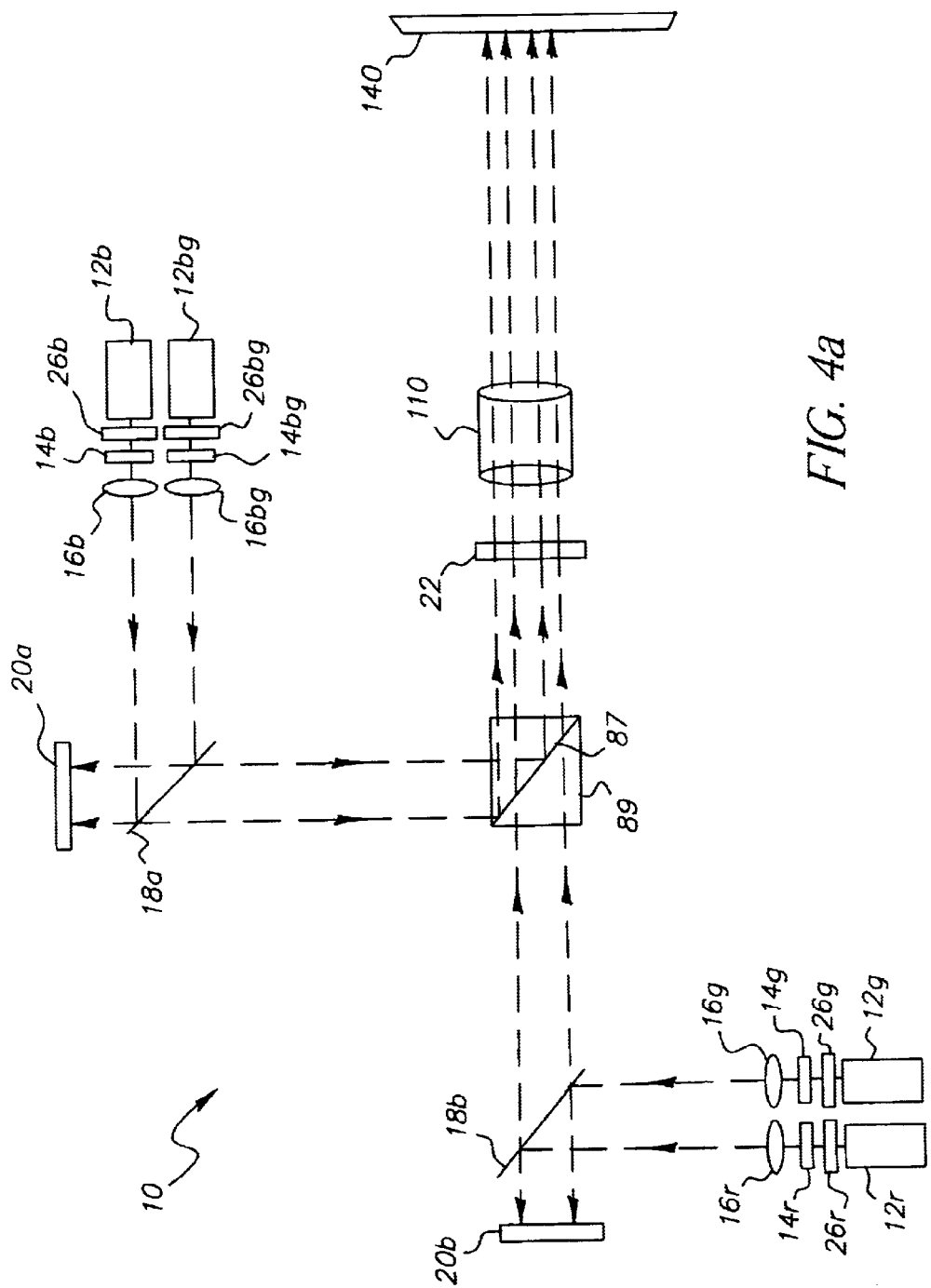
FIGS. 4a and 4b are schematic block diagrams showing a four-color projection system using two spatial light modulators in two different embodiments.

Referring to FIG. 4a, there is shown a preferred embodiment of a projection system 10 of the present invention, having a modulation path for each of four component colors. In FIG. 4a, the color of each modulation path is indicated with an appended letter where necessary, as follows: r for components in the red modulation path, g for components in the green path, b for components in the blue path, and bg for components in the blue-green or other modulation path. For the purpose of the following description, however, the appended letter is omitted, except where necessary to distinguish activity distinctive to a particular color path. Each color path has a separate light source 12, with additional light conditioning and polarization handling components, as necessary.

The basic operation of each light modulation path can be traced by following light in the red modulation path. Light source 12, a gas laser in the preferred embodiment, provides the source illumination that is modulated, as switched through a shutter 26. Uniformizing optics 14 homogenize the light from light source 12 to provide a uniform field. A telecentric condenser lens 16, which may be an individual lens but is more likely a set of lenses, provides the uniformized source light beam as essentially telecentric light which is reflected toward a spatial light modulator 20 by a polarizing beamsplitter 18. Polarizing beamsplitter 18 transmits light having an unwanted polarization state and directs light of the intended polarization state as incident light to spatial light modulator 20.

In the preferred embodiment, spatial light modulator 20 is a reflective LCD. Spatial light modulator 20, using selective, variable rotation of light polarization for each individual pixel, as is well known in the imaging arts, modulates the incident light to provide a modulated color beam. Acting as a combiner, a dichroic mirror 87 reflects the modulated light from spatial light modulator 20a and transmits the modulated light from spatial light modulator 20b toward a projection lens 110 which then directs the combined colored modulated light onto a display surface 140. An analyzer 22 is provided in the combined, modulated light path, to improve image contrast.

FIG. 4a shows the arrangement of color modulation paths used in a preferred embodiment. Here, spatial light modulator 20a modulates incident blue and blue-green light from light sources 12b and 12bg. Spatial light modulator 20b modulates incident red and green light from light sources 12r and 12g. This arrangement of colors optimizes the response of spatial light modulators 20a and 20b. For spatial light modulator 20a, for example, voltage bias levels for optimal blue and blue-green color modulation are nearly identical. With bias levels this close, color-to-color differences in device response are small enough that look-up tables (LUT) in the data path (not shown) to spatial light modulator 20 can be used to compensate, rather than attempting to adjust spatial light modulator 20 setup parameters for each color. For spatial light modulator 20b, voltage bias levels for optimal green and red color modulation are close, but some adjustment is desirable. Since this adjustment is small, modulator device settling time is minimized when changing between red and green light modulation. It is instructive to note that other criteria for pairing colors could be used. For example, colors could be paired in order to minimize luminance flicker that can make switching between colors more perceptible to a viewer, as is described below. Or, colors could be paired according to the polarization state of light source 12.

Figure 4B:
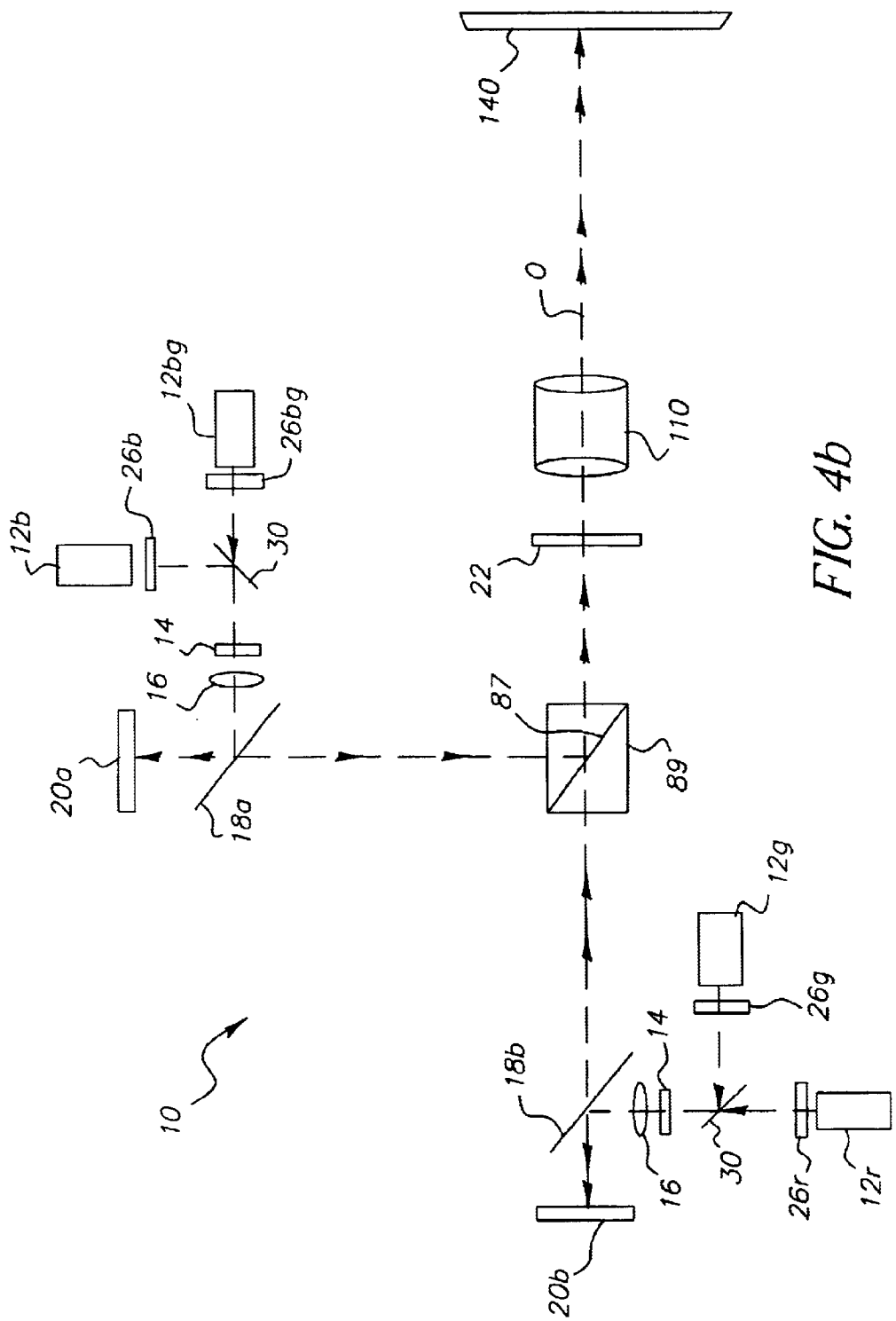

FIG. 4b shows an alterative, improved embodiment that reduces the number of components and maximizes brightness in the imaging path. In the arrangement of FIG. 4b, a dichroic combiner 30 is deployed to combine blue and blue-green source light paths along a single axis directed toward spatial light modulator 20a. Uniformizing optics 14 and condenser lens 16 can then serve the combined source light path for both blue and blue-green light sources 12b and 12bg. Similarly, another dichroic combiner 30 combines red and green light paths along a single axis for spatial light modulator 20b, reducing uniformizing optics 14 and condenser lens 16 requirements for this combined light path. Dichroic mirror 87, acting as a combiner, then combines the modulated light beams of all four component colors along a single output axis O for projection by projection lens 110.

The preferred embodiments of FIGS. 4a and 4b admit a number of alternative types of components for performing the various shuttering, light conditioning, modulation, and polarization handling functions. As was stated above, while light source 12 is preferably a laser, other types of light source could be used, such as LEDs, for example. Important characteristics for light source 12 include relatively high spectral purity, high brightness level, and correct polarization state when using an LCD as spatial light modulator 20.

Uniformizing optics 14 may comprise any of a variety of lenslet arrays, integrating bar, integrating tunnel, such as the LightTunnel™ available from Unaxis Optics, Liechtenstein, or other optical components suitable for providing illumination over a sufficiently wide field for spatial light modulator 20. In a preferred embodiment, for the illumination beam that is provided through uniformizing optics 14, the width:height aspect ratio corresponds to the width:height aspect ratio of the modulating surface of spatial light modulator 20. This arrangement provides the most efficient use of light and helps to provide a uniform field. For minimizing astigmatism in the combined color imaging path, dichroic mirror 87 may alternately be encapsulated within a prism 89. A shutter 26 is provided for switching light from light source 12 into each illumination path. Shutter 26 could be a mechanical shutter or could be an acousto-optical modulator AOM, as is well-known among optical switching devices.

Polarizing beamsplitters 18 are wire-grid beamsplitters in the preferred embodiment. Wire-grid beamsplitters have favorable angular and spectral response and provide relatively high contrast when compared with conventional types of polarizing beamsplitters 18. These devices could alternately be standard McNeille prisms or other suitable devices. Projection lens 110 and display surface 140 are selected to work together for optimal projection results.

Spatial light modulator 20 as used in the apparatus of FIGS. 4a and 4b is an LCD. Alternative types of devices could serve as spatial light modulator 20. For example, a transmissive LCD could be used. With a transmissive LCD, light source 12 would be positioned to transmit light, switched through shutter 26 and conditioned by uniformizing optics 14 and lens 16, through spatial light modulator 20. There would be no need for polarizing beamsplitter 18 with a transmissive LCD. As another alternative, a digital micromirror device (DMD) or similar device could be employed as spatial light modulator 20. Using a DMD, polarization-conditioning components would not be required. Rather than modulate using polarization, the DMD modulates by reflecting incident light at an angle, as is shown in U.S. Pat. No. 5,905,545, cited above. Methods for directing source light to DMDs are familiar to those skilled in the digital projection arts.

It would also be possible to omit dichroic mirror 87 or other combining component and to project each modulated colored light beam separately onto display surface 140, using a separate projection lens 110 for each color. However, such an arrangement can be considerably more cumbersome and costly.

Not shown in FIG. 4a or 4b are logic control components used to direct image data to spatial light modulators 20a and 20b and to control shutters 26r, 26g, 26b, and 26bg.

Timing Sequence for Dual Spatial Light Modulators 20

Figure 5A:
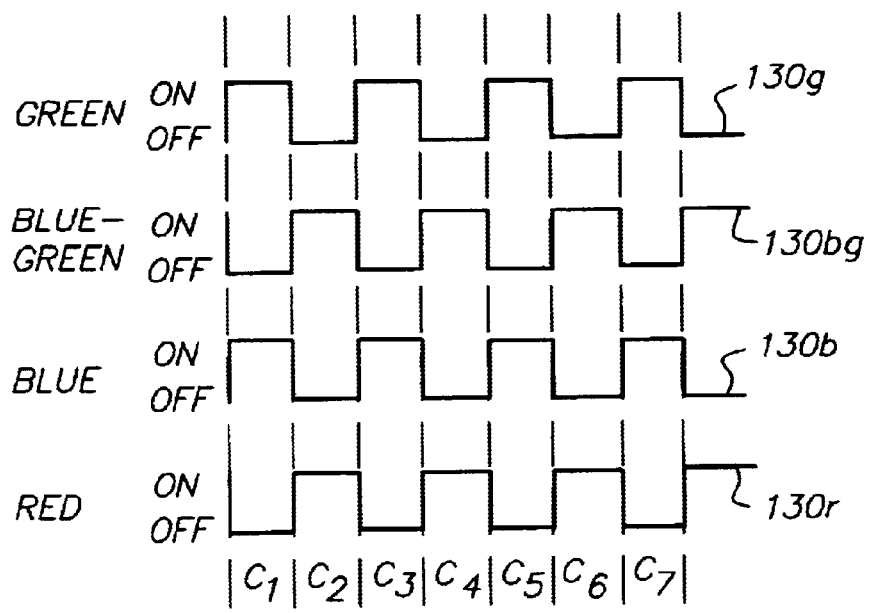
FIG. 5a is a graph showing modulation timing, by color, using the arrangement of a preferred embodiment of the present invention.

Referring to FIG. 5a, there is shown a straightforward multiplexing sequence with spatial light modulator 20 timing for the apparatus of FIG. 4a. For each light path, a corresponding modulation timing waveform 130 is shown. During each time period $C_1$–$C_7$, each spatial light modulator 20 provides modulation for light from one light source 12. Thus, for example, spatial light modulator 20b alternately modulates red and green light, providing red and green modulation timing waveforms 130r and 130g accordingly. During time period $C_1$, spatial light modulator 20b modulates red light and the green light is off. Then, during the next time period, $C_2$, spatial light modulator 20b modulates green light and the red light is off. Similarly, spatial light modulator 20a provides blue and blue-green modulation timing waveforms 130b and 130bg.

Figure 5B:
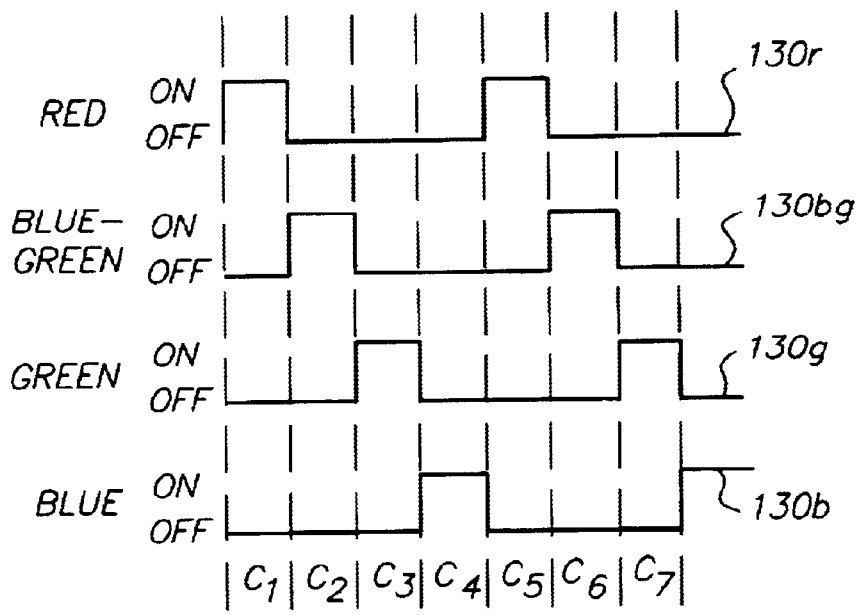
FIGS. 5b and 5c are graphs showing alternate arrangements of modulation timing.

Referring to FIG. 5b, there is shown an alternative timing sequence that could be used. Here, a single color is modulated at one time. With respect to timing, this arrangement is similar to the timing that would be provided using a color-sequential multiplexing arrangement with a filter wheel, such as is disclosed in application WO 01/95544, with the recommended improvement of an added shutter 26, as in FIGS. 4a and 4b, for cleaner transitions between colors. The arrangement of FIG. 5b has the advantage of allowing ample data loading and device settling time for each spatial light modulator 20. Referring back to the component arrangement of FIGS. 4a and 4b, for example, after modulating red light in period $C_1$, spatial light modulator 20b has a full cycle, $C_2$ in FIG. 5b, during which to load data and set bias voltage for modulating green light in period $C_3$.

Figure 5C:
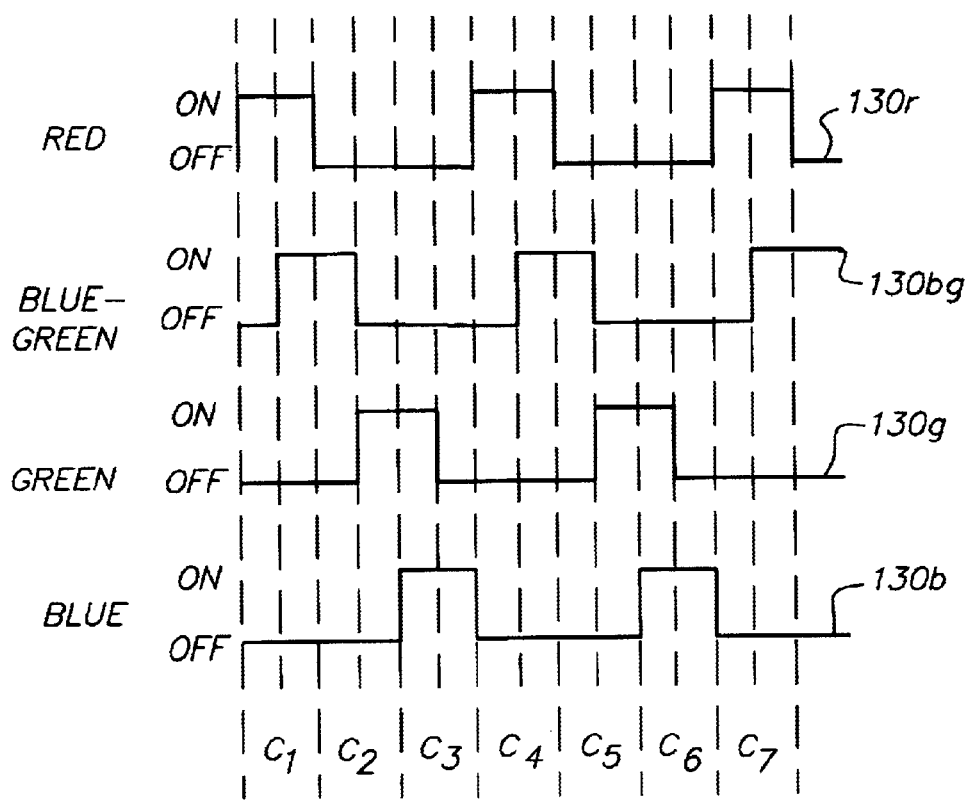

Referring to FIG. 5c, there is shown yet another alternative timing sequence wherein the modulation periods for each spatial light modulator 20a, 20b are offset, with two colors modulated during some portions of periods $C_n$ and with transitions staggered so that only half of the transitions occur simultaneously. With this arrangement, substantial data loading and device settling time is provided for each spatial light modulator 20a, 20b.

Figure 5D:
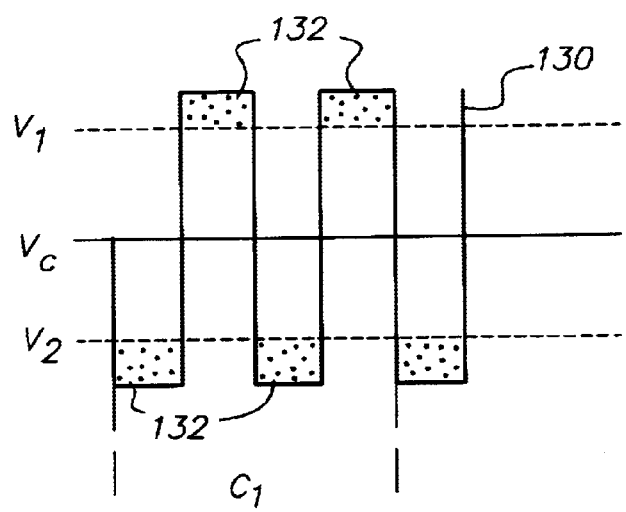
FIG. 5d is a graph showing the actual bias voltage states and modulation signal in a preferred embodiment of the present invention.

The actual timing required by a specific device determines the characteristics of the signal provided to spatial light modulator 20 during each time period $C_n$. Referring to FIG. 5d, there is shown an enlarged view with modulation timing waveform 130 applied for a specific spatial light modulator 20 in a preferred embodiment. Here, spatial light modulator 20 requires alternating drive voltage polarity, which helps to compensate for charge build-up effects in the device itself. Alternate black-level voltages are $V_1$ and $V_2$, above and below a bias voltage level $V_c$. The modulation signal itself is video signal 132. Depending on characteristics of the device used as spatial light modulator 20 and on color response variations, bias voltage level $V_c$ may have a different level for optimum performance for each color. Thus, part of the device setup required when changing from one illumination color to the next is to adjust bias voltage level $V_c$ accordingly. As was noted above, because this adjustment requires response time, there would be advantages in eliminating the need to make a bias voltage level $V_c$ adjustment between colors, or at least in minimizing the difference between two distinct bias voltage levels $V_c$ for the colors that are paired to a single spatial light modulator 20. In prior art embodiments described in the background material above, where three primary colors (typically R, G, and B) share the same spatial light modulator 20, it is unlikely that bias voltage levels $V_c$ are the same for all three colors. However, as was described with reference to FIG. 4a, where only two colors share the same spatial light modulator 20, it may be possible to group colors based on this bias voltage level $V_c$ requirement. In some cases, an average voltage can be used, allowing look-up tables or other techniques to compensate for slight differences in device response. Where a single voltage cannot be used for bias voltage level $V_c$, it can be possible to group colors so that very little difference in voltage is needed, minimizing device settling time requirements.

It is instructive to note that the timing waveforms of FIG. 5a, 5b, and 5c are exemplary and are not intended to be limiting. Alternate arrangements are possible, particularly since device timing is under control of electronic timing circuitry (not shown) that can be synchronized with the data that is sent to spatial light modulators 20a and 20b. Unlike conventional color film projection, with a fixed rate of 24 frames per second (48 frames per second due to double-shuttering), digital projectors can vary the period $C_n$ timing to better suit the needed brightness and overall image quality conditions of the viewing environment. While there are some well-established timing constraints, such as those relating to frequencies for flicker detection by the human eye, there appears to be some flexibility in terms of light intensity and duration for providing motion color images. Thus, for example, while periods $C_n$ in FIG. 5a may work well at 1/48 second, the periods $C_n$ of FIG. 5c may provide better image quality at 1/96 second.

Figure 6A:
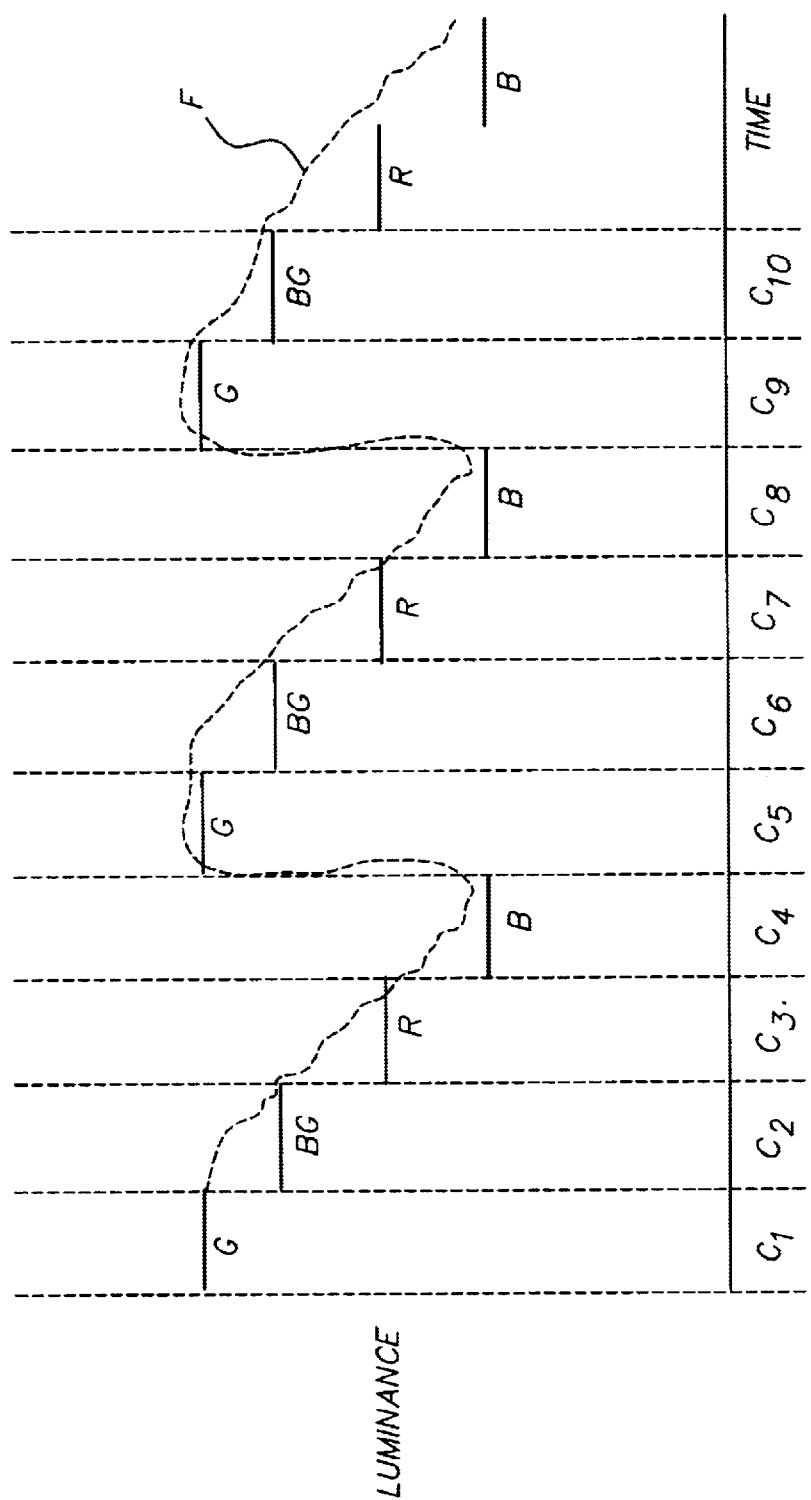
FIG. 6a is a timing diagram showing one sequence of color transitions as a sequence of luminance-level transitions.
Figure 6B:
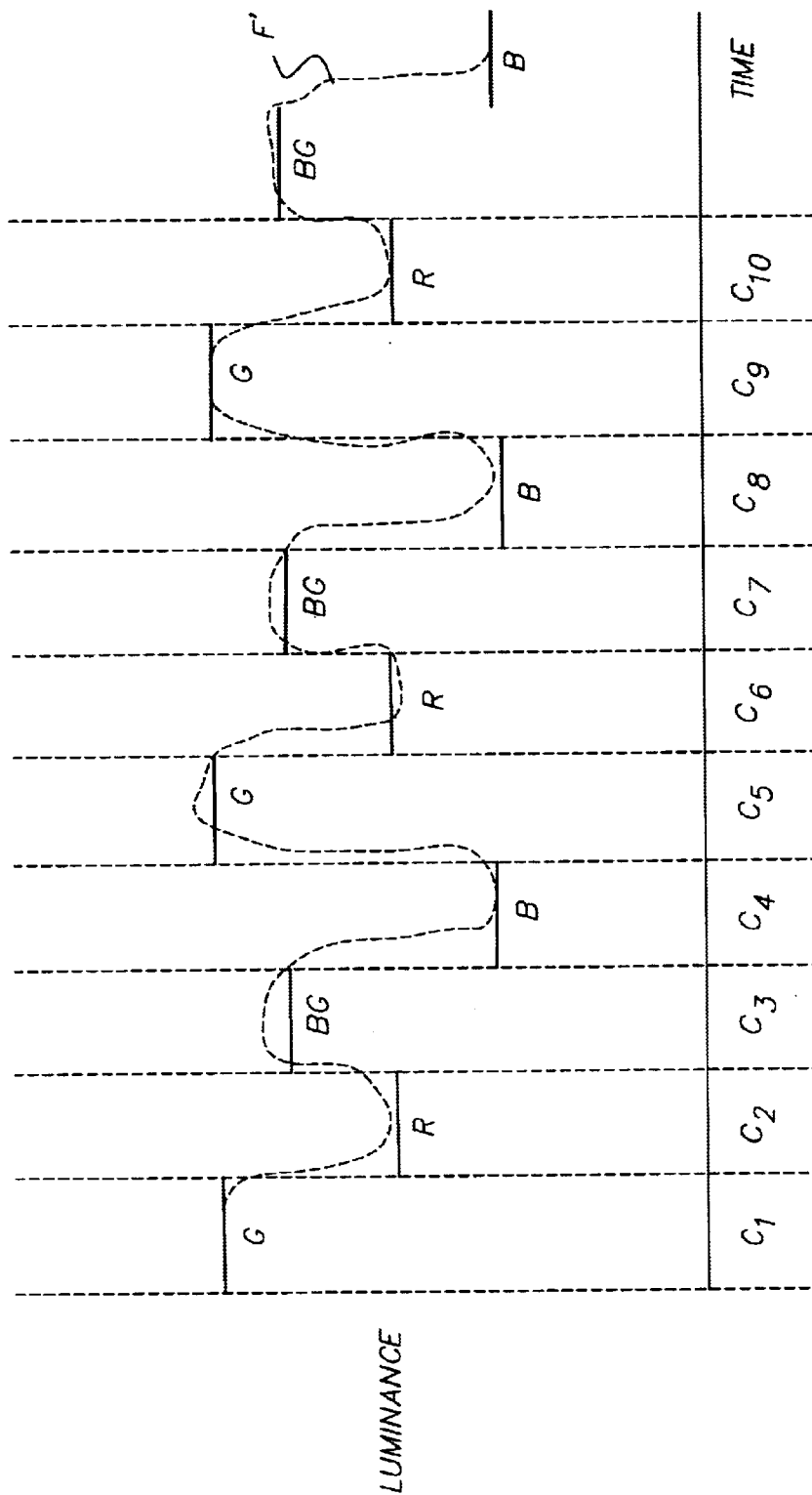

One consideration for color sequencing, noted above, relates to minimizing flicker effects. When viewing image frames displayed in rapid succession, the sensitivity of the human eye to flicker depends on the luminance difference between frames as well as on the frequency. Thus, manipulating both luminance and frequency may be effective for eliminating flicker effects. Referring to FIGS. 6a and 6b, there are shown two alternate sequences for sequential color display, showing relative luminance of each color. In the sequence of FIG. 6a, color modulation cycles through the individual colors G, BG, R, and B so that luminance change has an apparent frequency illustrated by line F. In contrast, the sequence of FIG. 6b shows modulation cycled through these colors in a different order, so that the apparent frequency illustrated by line F' is twice the frequency traced by line F in FIG. 6a, thereby shifting this apparent frequency from the visible range. Thus, a simple rearrangement of color sequence may minimize the visibility of flicker in a four-color display. However, it must be observed that this rearrangement may necessitate a reassignment of light sources 12 to spatial light modulators 20, as shown in FIG. 4a.

Camcorder Defeat Techniques Using the Present Invention

An unexpected and useful consequence of the use of paired spatial light modulators as shown in the example embodiments of FIG. 4a and 4b relates to techniques for diminishing the quality of video-camera copying of projected images from projection apparatus 10. By suitable adjustments to the timing sequence of light modulation, undesirable color effects can be caused in a copy made using video-camera sampling. At the same time, the effects caused would not be detectable to a viewer of the projected image. For example, the timing of color modulation switching, as was described with reference to FIGS. 5a, 5b, and 5c, can be set so that one or more colors are not detected by a video camera working at standard sampling rates. Alternately, the switching sequence for modulation timing waveforms 130r, 130g, 130b, and 130bg can be adjusted so that specific projected colors are not detected during each display period $C_n$, causing an undesirable cycling of color frames to occur in a copy. Light intensities and time periods $C_n$ can also be adjusted to display images that are acceptable to the human eye but cause objectionable color artifacts when sampled by video-camera circuitry.

Figure 7:
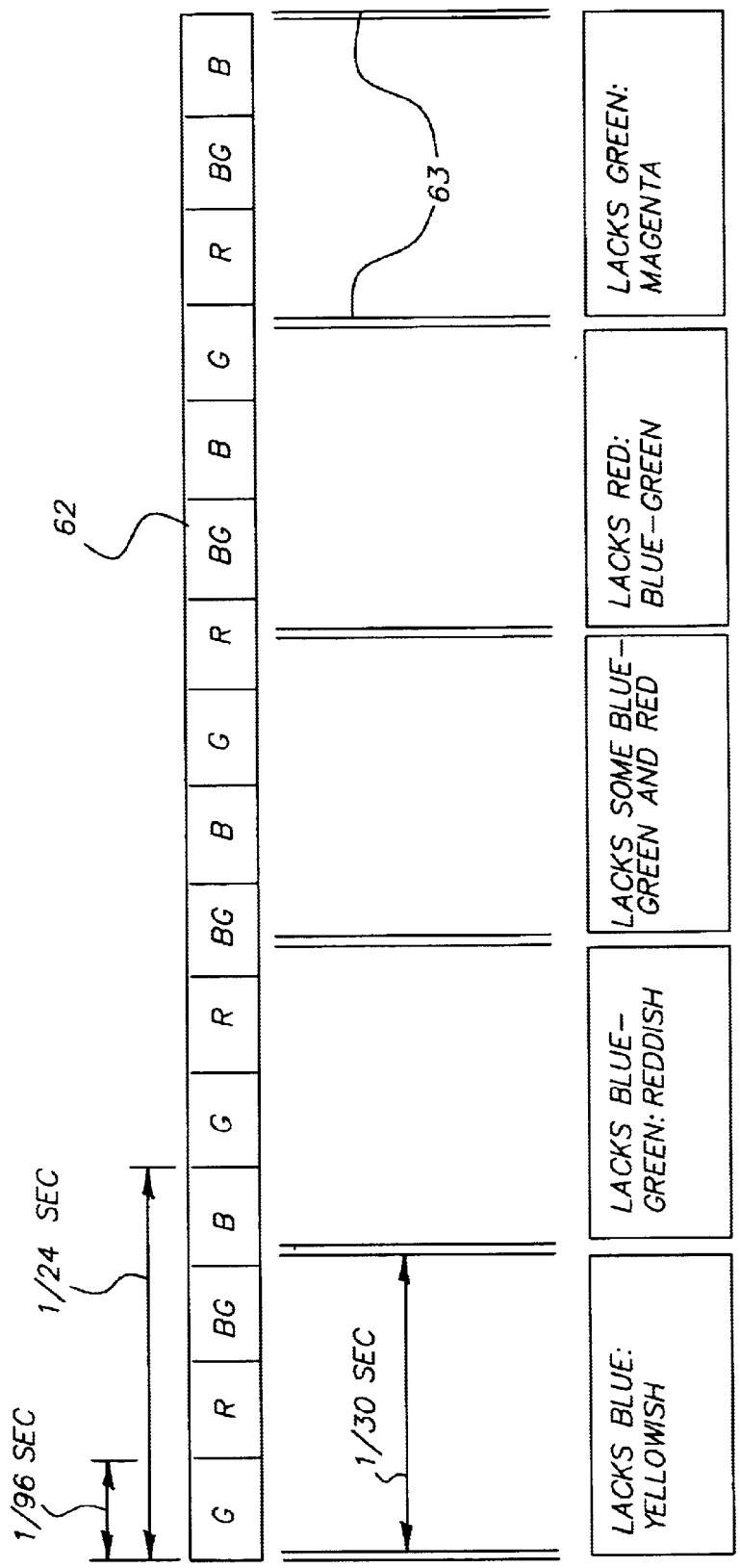
FIG. 7 is a timing diagram that correlates one sequence of single-color transitions to a typical camcorder timing sequence.

With the goal of causing unpleasant color effects in a camcorder copy, FIG. 7 shows how a color sequence 62, sampled by a video camera in a succession of samples 63, causes undesirable color effects 61 that repeat at a low frequency. However, the same principle illustrated in FIG. 7 would apply for any selection of component colors. During each sample 63, only a portion of the component colors are displayed. Thus, the recorded color image has color effects 61 that vary, depending on where in the cycle samples 63 are taken. When the display frequency for color sequence 62 is properly specified, color effects 61 occur at a low frequency, such as between 6 and 12 Hz. This frequency is perceptible and can render a copied motion picture unpleasant to view.

It can be appreciated that the present invention provides an apparatus and method that allows projection of bright images with an expanded color gamut. The present invention has advantages in implementation over field-sequential solutions that use a single spatial light modulator 20, but without the added cost required for apparatus that use simultaneous modulation and a spatial light modulator 20 for each color. Using a pair of spatial light modulators 20, each shared by two colors, apparatus 10 meets the goal of providing improved color gamut, but with less cost and with fewer timing constraints than with other solutions. Finally, apparatus 10 allows the design of counter-measures to discourage copying of displayed motion picture content using a video camera.

It is worthwhile to note that, while the preferred and alternate embodiments described above show the use of four colors, the present invention can be extended to use five, six, or more light sources 12, with additional spatial light modulators 20 deployed accordingly. However, it can be appreciated that such arrangements would not only require compact packaging of optical components, but also would require considerable computational complexity in determining how to represent any specific color in the color gamut thus obtained.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

Thus, what is provided is an apparatus and method for projection of high-resolution motion-picture images from digital data using dual spatial light modulators, wherein an improved color gamut can be obtained.

PARTS LIST

10. Projection system
12. Light source
12r. Red light source
12g. Green light source
12b. Blue light source
12bg. Blue-green light source
14. Uniformizing optics
14r. Uniformizing optics, red light path
14g. Uniformizing optics, green light path
14b. Uniformizing optics, blue light path
14bg. Uniformizing optics, blue-green light path
16. Condenser lens
16r. Condenser lens, red light path
16g. Condenser lens, green light path
16b. Condenser lens, blue light path
16bg. Condenser lens, blue-green light path
18. Polarizing beamsplitter
18a. Polarizing beamsplitter
18b. Polarizing beamsplitter
20. Spatial light modulator
20a. Spatial light modulator
20b. Spatial light modulator
22. Analyzer
26. Shutter
26r. Shutter, red light path
26g. Shutter, green light path
26b. Shutter, blue light path
26bg. Shutter, blue-green light path
30. Dichroic combiner
61. Color effects
62. Color sequence
63. Samples
87. Dichroic mirror
89. Prism
100. Visible gamut
102. Motion picture film gamut
104. NTSC TV gamut
106. Four-source gamut
108. Vertices
112. Vertices
114. Vertices
116. Vertices
110. Projection lens
118r. Red sensitivity curve
118g. Green sensitivity curve
118b. Blue sensitivity curve
130. Modulation timing waveform
130r. Red modulation timing waveform
130g. Green modulation timing waveform
130b. Blue modulation timing waveform
130bg. Blue-green modulation timing waveform
132. Video signal
140. Display surface

What is claimed is:

1. A display apparatus for projection of a color image from digital data onto a surface comprising:
    (a) a first modulation system for providing a first modulated beam, said first modulation system comprising:
        (a1) a first spatial light modulator for modulating a first incident light beam in order to form said first modulated beam according to said digital data;
        (a2) a first light source for providing a first color beam as said first incident light beam;
        (a3) a second light source for providing a second color beam as said first incident light beam;
    (b) a second modulation system for providing a second modulated beam, said second modulation system comprising:
        (b1) a second spatial light modulator for modulating a second incident light beam in order to form said second modulated beam according to said digital data;
        (b2) a third light source for providing a third color beam as said second incident light beam;
        (b3) a fourth light source for providing a fourth color beam as said second incident light beam; and
    (c) an optical combiner for directing said first modulated beam and said second modulated beam for projection onto the surface by a projection lens.

2. A projection apparatus according to claim 1 further comprising an integrating bar for uniformizing said first light source.

3. A projection apparatus according to claim 1 further comprising an integrating tunnel for uniformizing said first light source.

4. The display apparatus of claim 1 wherein said first spatial light modulator is a reflective liquid crystal display device.

5. The display apparatus of claim 1 wherein said first spatial light modulator is a transmissive liquid crystal display device.

6. The display apparatus of claim 1 wherein said first spatial light modulator is a digital micromirror device.

7. The display apparatus of claim 1 wherein said first light source and said second light source are selected from the group consisting of red, green, blue, blue-green, and yellow-green light sources.

8. The display apparatus of claim 1 wherein said optical combiner comprises a dichroic surface.

9. The display apparatus of claim 1 wherein said optical combiner is a dichroic prism.

10. The display apparatus of claim 1 wherein said first light source comprises a laser.

11. The display apparatus of claim 1 wherein said first light source comprises an LED.

12. The display apparatus of claim 1 further comprising an optical shutter in the path of said first light source.

13. The display apparatus of claim 1 wherein said first modulation system further comprises a lenslet array for uniformizing said first incident light beam.

14. The display apparatus of claim 1 wherein said first spatial light modulator modulates said first incident light beam during the same time intervals as said second spatial light modulator modulates said second incident light beam.

15. The display apparatus of claim 1 wherein, during a periodically repeating time interval, only one of first spatial light modulator or second spatial light modulator is modulating.

16. The display apparatus of claim 1 wherein said optical combiner directs said first modulated beam and said second modulated beam onto a common optical axis for projection.

17. A projection apparatus according to claim 1 further comprising an analyzer ahead of said projection lens.

18. A projection apparatus according to claim 1 wherein said optical combiner comprises a dichroic surface.

19. A projection apparatus according to claim 1 wherein said first modulation system comprises a polarizing beamsplitter for providing said first incident light beam having a predetermined polarization state.

20. A projection apparatus according to claim 1 wherein said first modulation system comprises a wiregrid polarizing beamsplitter for providing said first incident light beam having a predetermined polarization state.

21. A projection apparatus according to claim 1 wherein said first modulation system comprises a McNeille polarizing beamsplitter for providing said first incident light beam having a predetermined polarization state.

22. A projection apparatus according to claim 1 wherein said first modulation system further comprises a dichroic combiner for directing said first color beam and said second color beam to said first spatial light modulator.

23. A display apparatus for projection of a color image from digital data onto a surface comprising:
  (a) a first modulation system for providing a first modulated beam, said first modulation system comprising:
    (a1) a first spatial light modulator for modulating a first incident light beam in order to form said first modulated beam according to said digital data;
    (a2) a red light source for providing, during a first periodically repeated interval, a red color beam as said first incident light beam;
    (a3) a green light source for providing, during a second periodically repeated interval, a green color beam as said first incident light beam;
  (b) a second modulation system for providing a second modulated beam, said second modulation system comprising:
    (b1) a second spatial light modulator for modulating a second incident light beam in order to form said second modulated beam according to said digital data;
    (b2) a blue-green light source for providing, during said first periodically repeated interval, a blue-green color beam as said second incident light beam;
    (b3) a blue light source for providing, during said second periodically repeated interval, a blue color beam as said second incident light beam;
  (c) wherein said first periodically repeated interval and said second periodically repeated interval alternate and do not overlap; and
  (d) an optical combiner for directing said first modulated beam and said second modulated beam for projection onto the surface by a projection lens.

24. A display apparatus for projection of a color image from digital data onto a surface comprising:
  (a) a first modulation system for providing a first modulated beam, said first modulation system comprising:
    (a1) a first spatial light modulator for modulating a first incident light beam in order to form said first modulated beam according to said digital data;
    (a2) a red light source for providing, during a first periodically repeated interval, a red color beam as said first incident light beam;
    (a3) a green light source for providing, during a third periodically repeated interval, a green color beam as said first incident light beam;
  (b) a second modulation system for providing a second modulated beam, said second modulation system comprising:
    (b1) a second spatial light modulator for modulating a second incident light beam in order to form said second modulated beam according to said digital data;
    (b2) a blue-green light source for providing, during a second periodically repeated interval, a blue-green color beam as said second incident light beam;
    (b3) a blue light source for providing, during a fourth periodically repeated interval, a blue color beam as said second incident light beam;
  (c) wherein said first, second, third, and fourth periodically repeated intervals are sequential and do not overlap; and
  (e) an optical combiner for directing said first modulated beam and said second modulated beam for projection onto the surface by a projection lens.

25. A method for projecting a color image from digital data onto a surface, the method comprising:
  (a) forming a first modulated beam by:
    (a1) providing a first color beam from a first light source;
    (a2) providing a second color beam from a second light source;
    (a3) in a repeated sequence, alternately directing said first color beam and said second color beam to a first spatial light modulator as a first incident light beam, said first spatial light modulator modulating said first incident light beam as an array of pixels to form said first modulated beam;
  (b) forming a second modulated beam by:
    (b1) providing a third color beam from a third light source;
    (b2) providing a fourth color beam from a fourth light source;
    (b3) in a repeated sequence, alternately directing said third color beam and said fourth color beam to a second spatial light modulator as a second incident light beam, said second spatial light modulator modulating said second incident light beam as an array of pixels to form said second modulated beam; and (c) combining said first modulated beam and said second modulated beam to form an output beam and projecting said output beam onto the surface in order to form the color image.

26. A method for projecting a color image according to claim 25 wherein said first modulated beam and said second modulated beam are alternated to form said output beam.

27. A method for projecting a color image according to claim 25 wherein the transition between directing said first color beam and said second color beam to said first spatial light modulator is substantially simultaneous with the transition between directing said third color beam and said fourth color beam to said second spatial light modulator.

28. A method for projecting a color image according to claim 25 wherein the step of combining said first and second modulated beams comprises the step of combining said first and second modulated beams on a single output axis.

29. A method for projecting a color image according to claim 25 wherein the step of providing a first color beam comprises the step of providing a laser beam.

30. A method for projecting a color image according to claim 25 wherein said first spatial light modulator is an LCD.

31. A method for displaying color motion picture content wherein the video camera has a predetermined sampling rate comprising:

(a) alternately directing, onto a first spatial light modulator, a first color beam from a first light source and a second color beam from a second light source;

(b) alternately directing, onto a second spatial light modulator, a third color beam from a third light source and a fourth color beam from a fourth light source; and (c) modulating, in a synchronous manner at a modulation rate, said first spatial light modulator and said second spatial light modulator, wherein said modulation rate is out of phase with said predetermined sampling rate.

32. A method for minimizing flicker in a digital projection system that modulates, in a display sequence, a first, a second, a third, and a fourth color, the method comprising the steps of:

(a) arranging said first, second, third, and fourth colors in a luminance sequence in order of highest, second highest, third highest, and fourth highest relative luminance value; and (b) ordering said display sequence according to said luminance sequence so that said color corresponding to said third highest relative luminance value is modulated immediately following said color corresponding to said highest relative luminance value in said sequence.

33. A method for minimizing flicker in a digital projection system according to claim 32 wherein the step of ordering said display sequence further arranges that said color corresponding to said second highest relative luminance value is modulated immediately following said color corresponding to said third highest relative luminance value in said sequence.

* * * * *